(No Model.)
DE W. C. PUTNAM.
CART.
No. 246,555. Patented Aug. 30, 1881.
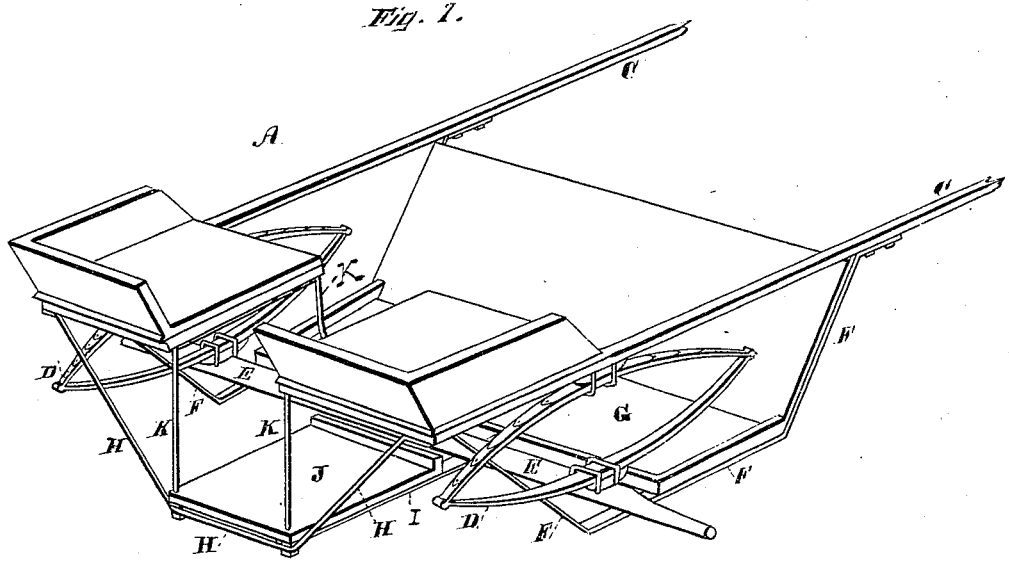
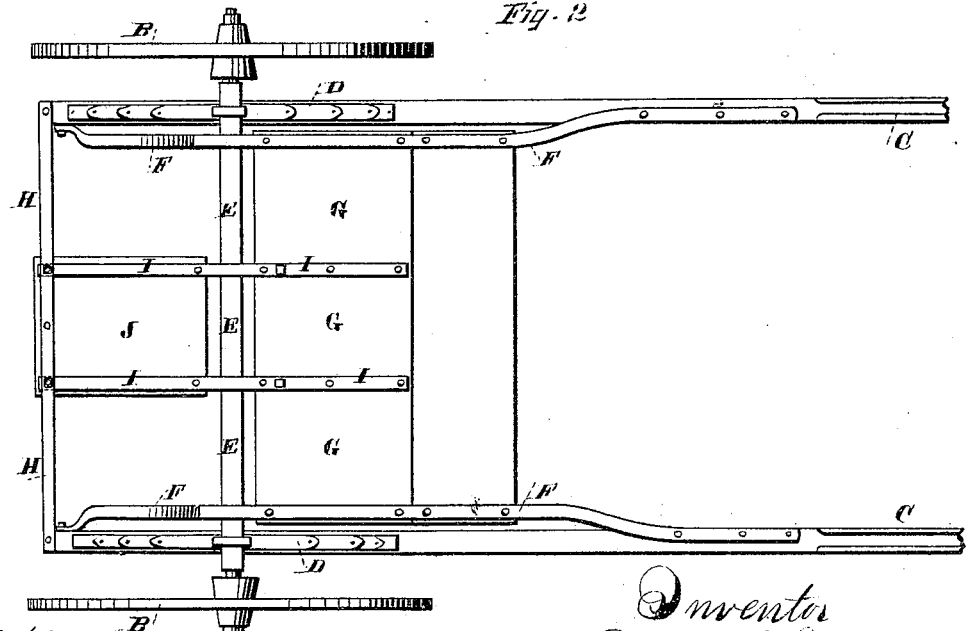
Witnesses
Frank A. Brooks
S. H. Nourse
Inventor
De Witt C. Putnam
By Dewey & Co
Attys
N. PETERS. Photo-Lithographer. Washington. D. C.

UNITED STATES PATENT OFFICE.

DE WITT C. PUTNAM, OF PETALUMA, CALIFORNIA.

CART.

SPECIFICATION forming part of Letters Patent No. 246,555, dated August 30, 1881.

Application filed June 6, 1881. (No model.)

*To all whom it may concern:*

Be it known that I, DE WITT C. PUTNAM, of Petaluma, county of Sonoma, State of California, have invented an Improvement in Carts; and I do hereby declare the following to be a full, clear, and exact description thereof.

This invention has relation to that class of vehicles known as carts, and more especially to such of the class as are built with a view to lightness, either to act in the capacity of a light carrier-wagon, or as a cart in which colts are broken to harness. In this respect I deem it best to refer to certain Letters Patent of the United States issued to me September 14, 1880, No. 232,207, the invention therein secured being connected herewith and forming a part of this, which may be considered as a further improvement thereon.

The object of this invention is to provide a cart which shall embody lightness with strength and a convenient means of access, these objects being accomplished by certain attachments which support a foot-board in front, as in my former invention, and by the further improvement of said attachments and appropriate construction thereof provide a means of supporting a suitable step behind, whereby the vehicle is adapted to be entered from the rear, and may afford convenient access. All of this will be fully seen in the following particular description and accompanying drawings, reference to which is hereby made, and in which—

Figure 1 is a perspective view of my invention. Fig. 2 is a bottom view.

Let A represent the body of the cart, having wheels B and shafts C. In Fig. 1 I have represented the body of the cart as having an opening behind and a seat on either side of the opening.

D represents the springs, and E the axle.

Attached to the shafts at about the whiffletree-bar are metallic bands or straps F, on either side. These straps extend on an incline downwardly and rearwardly, and are thence continued horizontally and rearwardly under the axle E, and not in any manner touching or being connected therewith, to a point behind said axle, and are then carried up inclined to the rear ends of the shafts, to which they are then bolted. Upon these straps thus secured is the foot-board G, laid transversely and secured to the straps forward of the axle. The construction thus far is the same as in my former invention, and I have thus particularly described it because it forms a necessary part of the whole device.

The rear ends of the straps F for convenience are not attached to the shafts underneath, but are bolted on the inside so that they do not interfere with the strap H, now described.

To the under side of the rear ends of the shafts is bolted the metal strap or band H, the sides of which extend downwardly and inclined toward each other, and form a straight horizontal base, the whole band being one piece and forming a support for the step, as hereinafter shown.

To the under side of the foot-board G are bolted the irons or bands I, which extend rearwardly under the axle and apart therefrom to and are secured in the angles of the strap or brace H. The bands H and I form a support for the step J, which is a board having its sides resting upon and supported by the horizontal straps I, and its rear end supported by the band H, upon the horizontal portion of which it rests. It extends forward upon the straps I not quite to the axle, so that said axle lies between the forward end of the step J and the rear end of the foot-board G.

K K represent metal rods or irons, the ends of which pass through the rear corners of the step J and through the bands I and H, and are secured underneath by nuts. They extend upwardly to the inner ends of the seats, and thence pass forward—forming a bridge or support for the inner ends of said seats—to the forward ends, and thence down to the foot-board G, forward of the axle. They pass through the foot-board and forward ends of the bands I, and are secured underneath by nuts.

It will be seen that nothing is attached to the axle; but all the supports being secured to the shafts and body or seat, the foot-board and step move in unison with the seat, the same spring which supports the seat serving as a spring for the said foot-board and step, and thus providing an easy means of entering the vehicle and supporting the feet. There will not be the unpleasant jar that a stationary foot-board or step would have.

I am aware that there is nothing novel in entering a vehicle from behind, and I do not claim such; but,

Having thus described my invention, what I claim as new, and desire to secure by Letters Patent, is—

1. In a vehicle, the combination of the straps F, foot-board G, brace H, supports or bands I, attached to the brace H and foot-board G and extending under the step J and bridge-braces K K, when arranged substantially as and for the purpose herein set forth.

2. In a vehicle adapted to be entered from behind, the step J, supported by bands I, brace H, and foot-board G, substantially as and for the purpose herein described.

3. In a vehicle having separate seats, as shown, the combination of the foot-board G, brace H, and bridge-braces K, whereby the inner ends of said seats are supported, substantially as herein described.

In witness whereof I have hereunto set my hand.

DE WITT C. PUTNAM.

Witnesses:
S. H. NOURSE,
WM. F. BOOTH.